United States Patent
Gaikwad et al.

(10) Patent No.: US 7,024,253 B2
(45) Date of Patent: Apr. 4, 2006

(54) AUTO-TUNING CONTROLLER USING LOOP-SHAPING

(75) Inventors: Sujit V. Gaikwad, Glendale, AZ (US);
Sachi K. Dash, Scottsdale, AZ (US);
Kosta S. Tsakalis, Chandler, AZ (US);
Gunter Stein, New Brighton, MN (US)

(73) Assignee: Honeywell International Inc., Morristown, NJ (US)

( * ) Notice: Subject to any disclaimer, the term of this patent is extended or adjusted under 35 U.S.C. 154(b) by 371 days.

(21) Appl. No.: 09/934,059

(22) Filed: Aug. 21, 2001

(65) Prior Publication Data

US 2002/0040250 A1    Apr. 4, 2002

Related U.S. Application Data

(60) Provisional application No. 60/227,051, filed on Aug. 21, 2000.

(51) Int. Cl.
*G05B 13/02*    (2006.01)

(52) U.S. Cl. .............................. 700/37; 700/28; 700/38; 700/42

(58) Field of Classification Search .................. 700/42, 700/37, 28, 29, 38, 40–43
See application file for complete search history.

(56) References Cited

U.S. PATENT DOCUMENTS

| | | | | |
|---|---|---|---|---|
| 4,539,633 A | * | 9/1985 | Shigemasa et al. | ............ 700/42 |
| 4,549,123 A | * | 10/1985 | Hagglund et al. | ........... 318/610 |
| 5,223,778 A | * | 6/1993 | Svarovsky et al. | ......... 318/610 |
| 5,371,670 A | * | 12/1994 | Lurie | ............................ 700/40 |
| 5,587,899 A | * | 12/1996 | Ho et al. | ........................ 700/37 |
| 5,748,467 A | * | 5/1998 | Qin et al. | ...................... 700/50 |
| 5,895,596 A | | 4/1999 | Stoddard et al. | |
| 6,207,937 B1 | | 3/2001 | Stoddard et al. | |
| 6,211,495 B1 | | 4/2001 | Stoddard et al. | |
| 6,222,164 B1 | | 4/2001 | Stoddard et al. | |
| 6,330,484 B1 | * | 12/2001 | Qin | ............................. 700/50 |

OTHER PUBLICATIONS

Wang et al, "New frequency-domain method for PID controllers," IEE Proc. Control Theory Appl., vol. 142, No. 4, Jul. 1995.*

Grassi et al, "PID Controller Tuning by Frequency Loop-Shaping," Proc. 35th Conference on Decision and Control, Japan, Dec. 1996.*

Panagopoulos et al, "Design of PID Controllers Based on Constrained Optimization," Proc. of the American Control Conf., California, Jun. 1999.*

(Continued)

*Primary Examiner*—John Follansbee
*Assistant Examiner*—Aaron C. Perez-Daple
(74) *Attorney, Agent, or Firm*—Schwegman, Lundberg, Wossner & Kluth

(57) ABSTRACT

A method and apparatus for automatically adjusting the gains of a feedback controller while the process continues to run and the controller continues to operate and control the process is disclosed. A desired closed-loop control bandwidth and a target loop transfer function are specified by the operator, and the tuning is accomplished automatically with minimal operator intervention and without the need for developing a model of the process. The automatic tuner subjects the process to one or more disturbance and the operation of both the process and the controller are monitored.

25 Claims, 2 Drawing Sheets

OTHER PUBLICATIONS

Astrom and Hagglund, "Autotuning", *Automatic Tuning of PID Controllers*, ISA, pp. 105-132, 1998.

Shinskey, "Self-Tuning Controllers", *Feedback Controllers for the Process Industries*, pp. 185-210, 1994.

E. Grassi, Proportional-Integral-Derivative Controller Tuning by Frequency Loop-Shaping, Ph.D. Dessertation, Arizona State University, Dec. 1999.

Voda et al., "A Method for the Auto-calibration of PID Controllers", Automatica, vol. 31, No. 1, pp. 41-53, 1995.

Harris et al., "Controller Tuning Using Optimization to Meet Multiple Closed-Loop Criteria", AIChE J., vol. 31, No. 3, pp. 484-487, 1985.

Schei, "Automatic Tuning of PID Controllers Based on Transfer Function Estimation", Automatica, vol. 30, No. 12, pp. 1983-1989, 1994.

Nishikawa et al., "A Method for Auto-Tuning of PID Control Parameters", Automatica, vol. 20, No. 3, pp. 321-332, 1984.

De Callafon et al., "Control Relevant Identification for H-norm based Performance Specifications", Proc. 34th CDC, 3498-3503, 1995.

Gevers et al., "Issues in Modeling for Control", Proc. 1998 ACC, 1615-1619.

Rivera et al., "Digital PID Conroller Tuning Using Prefiltered ARX Estimation", Proc. 31st CDC, pp. 68-69, 1992.

Grassi et al., PID Controller Tuning by Frequency Loop Shaping, Proc. 35th CDC, 1996.

Adusumilli et al., "Integrated MIMO Identification and Robust PID Controller Design Through Loop Shaping", Proc. 1998 ACC, pp. 1230-1234.

Ender et al., "Process Control Performance: Not as Good as You Think", Control Engineering, 180-190, Sep. 1993.

Grassi et al., "Integrated System Identification and PID Controller Tunig by Frequency Loop-Shaping", Proc. 38th Conf. Decision and Contr., 1517-1522, Phoenix, Arizona, Dec. 1999.

Grassi et al., "PID Controller Tuning by Frequency Loop Shaping: Application to Diffusion Furance Temperature Control", IEEE Trans. Contr. Syst. Techn., to appear, dated prior to Sep. 21, 2001.

Gaikwad e tal., "Auto-Tuning PID Using Loop-Shaping Ideas", Proc. 1999 IEEE Intl. Conf. On Control Applications, 589-593, Kohala Coast, Hawaii, Aug. 1999.

Krause et al., "Robust Parameter Adjustment", Proc. 1988 ACC, 331-336, Atlanta, Georgia, 1988.

Astrom et al., "Integrator Wind Up and How to Avoid It", Proc. 1989 ACC, pp. 1693-1698.

* cited by examiner

AUTO-TUNING CONTROLLER USING LOOP-SHAPING

This application claims the benefit of provisional application Ser. No. 60/227,051, filed Aug. 21, 2000.

FIELD OF THE INVENTION

This invention generally relates to a method and apparatus for controlling the operation of a process. More specifically, this invention provides a method and apparatus for automatically adjusting the gains of a proportional-integral-derivative controller while the controller continues to control the process.

BACKGROUND OF THE INVENTION

A simple proportional-integral-derivative (PID) feedback controller is the most popular apparatus used in the industry for controlling the operation and performance of a process. A feedback controller is also known as a closed-loop controller.

Systems used for operating plants and monitoring the operation of one or more processes within such plants typically include several feedback (or closed-loop) PID controllers, hereinafter referred to as PID controller or simply controller, as standard "equipment" with assumed default values for the PID gains. In order for these plants, and processes therein, to operate correctly and robustly, each of the PID gains of the controller must be adequately and appropriately tuned for the application at hand. When the "best" PID gains are used, the controller will quickly react to overcome and compensate for any internally and/or externally induced disturbances to which the process is subjected. Examples of disturbances are: change in control set point, change in process characteristics, sensor noise and uncertainty, etc. However, determining the appropriate PID gains is a challenging task for engineers and plant operators because some level of user expertise is necessary for successfully establishing the "best" gains.

Several tools, methods, and theories are available for tuning PID controller gains (for example, Astrom and Hagglund, *PID Controllers: Theory, Design, and Tuning*, 2nd ed., ISA, 1995). However, in practice the bulk of these methods require a lot of engineering effort to get satisfactory results. Currently, control engineers use commercially available tools only as a starting point, and then "play" with the PID gains to get acceptable results. This is a very time consuming effort. Therefore, the notion of an auto-tuning or a self-tuning PID controller for determining PID gains with minimal operator interaction is highly desirable. This concept has tremendous commercial value, and there are a number of automatic gain tuners in the market. In some automatic gain tuners, the controller PID gains are derived analytically based on a low-order model of the process. In other methods, the tuning is based on the optimization of some performance measure of the controller as related to the characteristics of the frequency and/or time response of the process. Persons skilled in the art will recognize that current auto-tuning techniques require frequent adjustment of the PID gains, are unreliable, and are not particularly effective (Shinskey, *Feedback Controllers for the Process Industries*, McGraw Hill, 1994). Yet, the tuning of PID gains remains a subject of great practical interest because of the large number of PID controllers in existence, e.g., a typical refinery could have as many as 3,000 PID controllers.

In view of the foregoing, it is desirable to provide an improved method for tuning the controller gains. It is preferable for the gain tuner to require minimal operator interaction and for the tuning to be accomplished without the need for models of the process and/or the controller. It is further desirable to tune the PID controller gains while the controller continues to control the process.

SUMMARY OF THE INVENTION

The preferred embodiment of this invention includes a method and apparatus for tuning a PID controller such that the individual PID gains are adjusted while the process is underway, and thus without the need for developing a representative model of the process. A desired closed-loop control bandwidth and a target loop transfer function are specified by the operator, and the tuning is preferably accomplished automatically with no additional operator intervention. The desired closed-loop control bandwidth is preferably indicative of the preferred settling time or the time constant of the process in response to a disturbance, and the target loop transfer function is the targeted or desired Laplace transfer function representative of the overall system or loop typically including the controlled process, the process controller, sensors, actuators, etc., and thus indicative of the desired response of the process (e.g., first-order response, second-order response, etc.). The automatic PID gain tuner subjects the process to one or more disturbance and the operation of both the process and the controller are monitored. In the preferred embodiment, the PID gains are estimated by using recursive least squares curve fitting techniques.

DETAILED DESCRIPTION OF THE PREFERRED EMBODIMENTS

Figure 1:
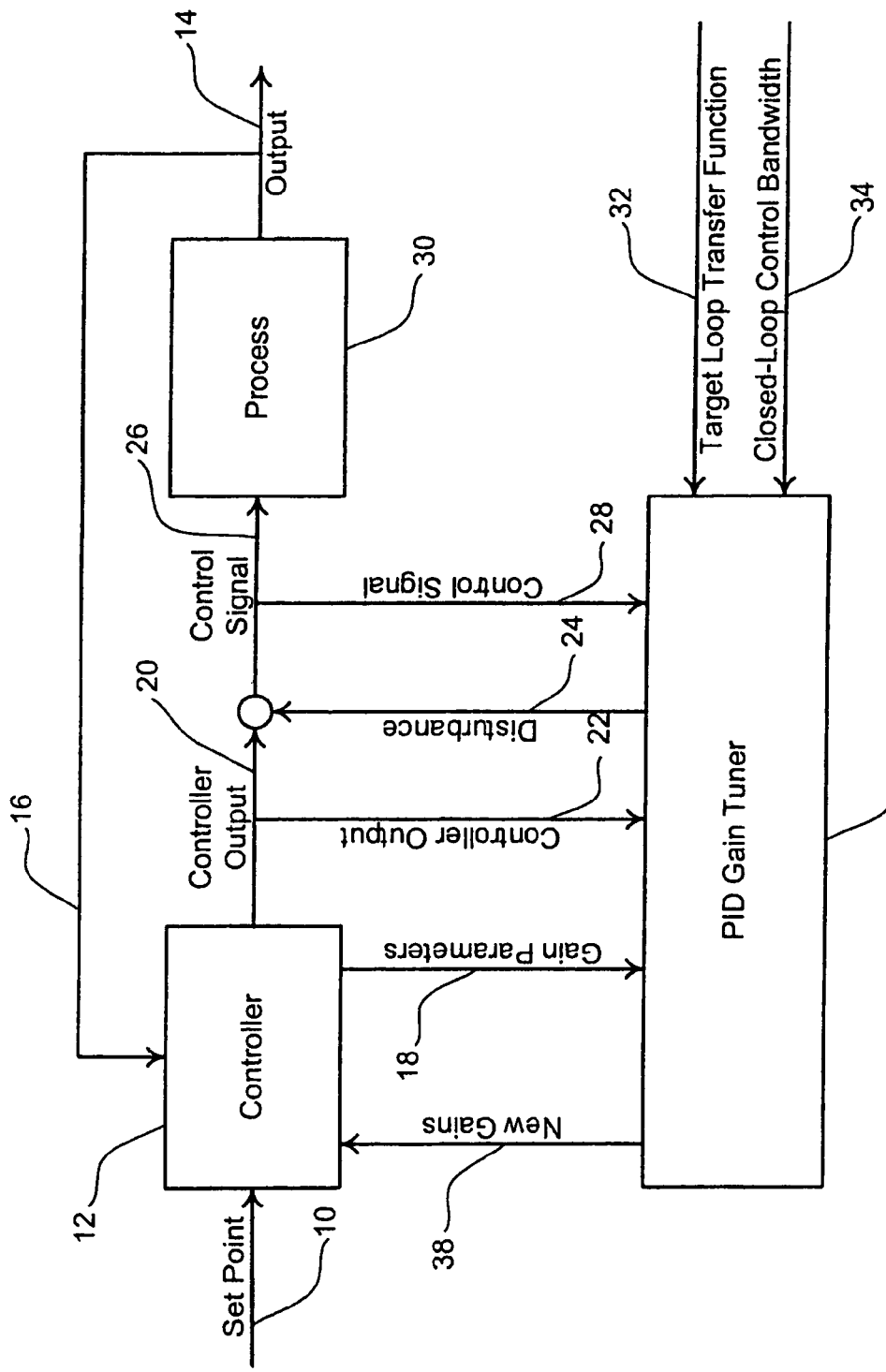
FIG. 1 is a block diagram of an automatic PID gain tuner, a process controller, and a process.

FIG. 1 is an illustrative block diagram of the invention showing the signal flows between PID controller 12, controlled process 30, and PID gain tuner 36. Controller 12 receives the process set point on path 10, and signal 16 indicative of the process output 14. Controller output on path 20 is adjusted by controller 12 to maintain process output on path 14 as close as possible to the process set point on path 10. Under normal operation, i.e., when PID gain tuning is not underway, and when the difference between process output 14 and process set point 10 is negligible and it is not necessary to change the controller's PID gains, controller output 20 is relayed as the process input control signal 26 for adjusting the operation of process 30.

PID gain tuner 36 is used for monitoring the performance of controller 12 and process 30 such that new PID gains can be determined automatically when initiated by an operator, upon reaching some a priori set conditions such as slow responding or un-responding process output 14 to changes in controller output 20, at a predetermined interval, etc. When PID gain tuning is initiated, a desired closed-loop control bandwidth on path 34 and a target loop transfer function on path 32 are either entered by an operator or pre-specified values are used. The desired closed-loop control bandwidth is preferably indicative of the preferred settling time or the time constant of the process in response to a disturbance, and the target loop transfer function is the targeted or desired Laplace transfer function representative of the overall system or loop typically including the controlled process, the process controller, sensors, actuators, etc., and thus indicative of the desired response of the process (e.g., first-order response, second-order response, etc.).

A disturbance signal is introduced on path 24 by PID gain tuner 36 to process 30 by perturbing the controller output on path 20 such that the process input control signal on path 26 is different from that necessary for maintaining process output 14 at process set point 10. PID gain tuner 36 monitors the controller's proportional error, integral error, and derivative error, provided on path 18, the controller output 20 on path 22, and the process input control signal 26 on path 28. In an illustrative embodiment, new values for the controller PID gains are then recursively computed by the PID gain tuner 36, and transmitted on path 38 to controller 12. The PID gains in controller 12 are then replaced by the new gains provided on path 38. In some embodiments, PID gain tuner 36 continues monitoring the performance of controller 12 and process 30, and automatically continues to adjust the PID gains until gain tuning is terminated by the operator and/or some a priori set conditions are satisfied.

Figure 2:
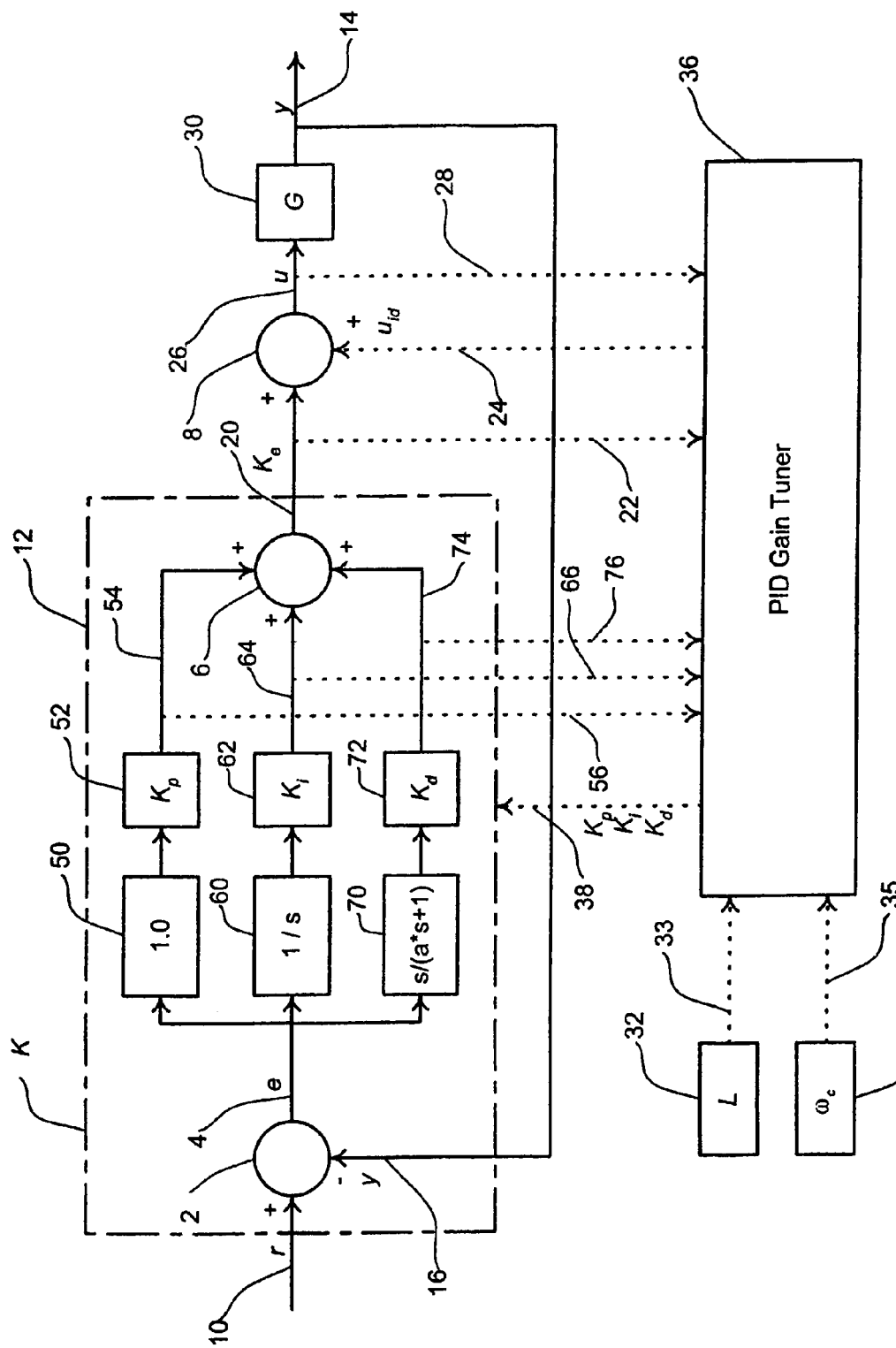
FIG. 2 is a more detailed block diagram of an illustrative embodiment of the present invention.

In FIG. 2, the individual functional blocks have internal labels describing the individual functions which each represent. Established conventions are followed in FIG. 2 to represent the various functions of the invention. Circles to which are supplied two or more signals imply a sum or difference calculation as indicated by the adjacent plus or minus signs. Thus, the plus and minus signs adjacent the junctions of paths 10 and 16, respectively, at summation element 2 implies subtraction of the value encoded in the signal on path 16 from the value encoded on path 10 to form an error e transmitted on path 4. Each rectangular block, say block 60, represents some type of mathematical or computational operation on the values encoded in the signals supplied to that block. Thus, the signal on path 4, which encodes the error e, is supplied to functional block 60, to collectively represent an apparatus which performs a Laplace transform operation on the error e. Other functional blocks represent decision operations, calculation of other mathematical functions, such as multiplication, and other operations of various types.

Referring now to FIG. 2, element 2 of controller K in block 12 subtracts the process output y 14 received on path 16 from the set point r on path 10 to form the error e on path 4. The error e on path 4 is sequentially operated on by blocks 50 and 52 to form a proportional error which is transmitted on path 54 to summation element 6 and which is also transmitted on path 56 to the PID gain tuner 36. Block 50 performs the function of multiplying the error e with the numeric value shown in block 50, said numeric value typically being 1.0, and block 52 performs the function of multiplying the signal from block 50 with the proportional gain value designated as $K_p$ in block 52. Similarly, the error e on path 4 is sequentially operated on by blocks 60 and 62 to form an integral error which is transmitted on path 64 to summation element 6 and which is also transmitted on path 66 to the PID gain tuner 36. Block 60 performs an integration Laplace transformation on the error e input on path 4, and block 62 multiplies the signal from block 60 with the integral gain value designated as $K_i$ in block 62. Additionally, the error e on path 4 is sequentially operated on by blocks 70 and 72 to form a derivative error which is transmitted on path 74 to summation element 6 and which is also transmitted on path 76 to the PID gain tuner 36. Block 70 performs a derivative Laplace transformation on the error e input on path 4, and block 72 performs the function of multiplying the signal from block 70 with the derivative gain value designated as $K_d$ in block 72. Summation element 6 of controller 12 adds the proportional, integral, and derivative errors received on paths 54, 64, and 74, respectively, to yield a controller output signal Ke. The controller output Ke is transmitted on path 20 to summation element 8 and also on path 22 to the PID gain tuner 36.

Under normal controller operation, i.e., when PID gain tuning is not underway, PID gain tuner 36 remains inactive and controller output Ke received on path 20 by element 8 is transmitted without modification as the process input control signal u on paths 26 and 28, respectively, to the controlled process 30 and the PID gain tuner 36. The controlled process represented in block 30 by the Laplace transfer function G includes a plurality of control elements controlled by controller 12. Controlled process 30 receives the process input control signal u on path 26 and manipulates the operation of the control elements to match the process output y 14 to the process set point r 10. Typical examples of control elements are valves, pumps, fans, etc.

The algorithms used in the PID gain tuner 36 for determining new PID gains for controller 12, as envisioned in the preferred embodiment of this invention will now be discussed in detail. The objective of a feedback controller is to maintain a system or process at a desired output level in the presence of disturbances, uncertainty, system instability, measurement noise, etc. In such controllers, the closed-loop transfer functions relating the error e on path 4 to the set-point r on path 10 are:

$$e = \frac{1}{1+GK}(r-d_0) + \frac{GK}{1+GK}n - \frac{G1}{1+GK}d_i \qquad \text{Equation (1)}$$

$$e = S(r-d_o - Gd_i) + Tn \qquad \text{Equation (2)}$$

where, n is the measurement noise imposed on the process output y 14 resulting from the characteristics of the sensors, transmitters, receivers, etc., used for measuring the process output 14, $d_o$ and $d_i$, are disturbances experienced by the controlled process 30, G is the transfer function representative of the process 30 being controlled, K is the transfer function representative of the controller 12, S=1/(1+GK) is a sensitivity function, and T=GK/(1+GK) is a complimentary sensitivity function.

It is desirable to keep the error e on path 4 small which translates to the minimization of both S and T. However, the control system must also meet the fundamental constraint of S+T=1. Therefore, S and T can not be made arbitrarily small at the same time. Realizing that set points and disturbances are typically low frequency signals and measurement noise is a high frequency signal, satisfactory performance can be achieved by making S small at low frequencies and T small at high frequencies. Since both S and T depend on the transfer function of the overall system which includes the controlled process, process controller, sensors, actuators, etc., a target loop transfer function L is selected in block 32, and transmitted on path 33 to the PID gain tuner 36, such that the closed-loop transfer functions have desirable properties. Loop-shaping is the classic frequency based control design methodology that achieves this objective by shaping the open-loop transfer function, $$L(j\omega)=G(j\omega)K(j\omega) \quad \text{Equation (3)}$$

This is done by choosing loop-shapes that have a large gain at low frequencies below crossover and a small gain at high frequencies above crossover. The controller K, i.e., the PID gains of the controller 12, is selected such that the loop transfer function GK approximates the target loop transfer function L specified in block 32.

As previously described, the target loop transfer function is the targeted or desired Laplace transfer function representative of the overall system or loop typically including the controlled process, the process controller, sensors, actuators, etc., and thus indicative of the desired response of the process (e.g., first-order response, second-order response, etc.). The PID gain tuner 36 selects the target loop-shape based on the desired closed-loop control bandwidth $\omega_c$ specified in block 34, and the nature of the process specified by the operator as an input to block 32. For example, if the operator specifies the process to be stable in nature, then the PID gain tuner 36 will select a first-order shape for the target loop transfer function ($L=\omega_c/s$). Alternately, if the operator specifies the process as having an integration nature, then the PID gain tuner 36 will select a second-order shape for the target loop transfer function, $$\left(L = \frac{\omega_c\left(s + \frac{\omega_c}{x}\right)}{s^2}\right) \quad \text{Equation (4)}$$

Here x is a parameter that governs the low-frequency slope or overshoot in response to a step change in the set point. Selection of the target loop transfer function L is governed by bandwidth constraints imposed by uncertainty, non-minimum phase behavior and unstable poles.

As part of the tuning method, one or more system disturbance $u_{id}$ is generated by the PID gain tuner 36 and transmitted to summation element 8 on path 24. It is important for the disturbance signal $u_{id}$ on path 24 to be plant friendly, i.e., a signal with which the operator is comfortable. The controller output Ke on path 20 and the disturbance signal $u_{id}$ on path 24 are arithmetically added by summation element 8 and then transmitted on path 26 as the process input control signal u to the process 30. The disturbance signal $u_{id}$ on path 24 is selected to have power in the frequency region around the desired closed-loop control bandwidth $\omega_c$ specified in block 34 and transmitted on path 35 to the PID gain tuner 36. As previously described, the desired closed-loop control bandwidth is preferably indicative of the preferred settling time or the time constant of the process in response to any disturbance. The preferred settling time for the process typically represents the desired or acceptable duration of time within which the process output should reach stability after the process has been subjected to a disturbance such as a step change in the control set point. As is well known in the art, the time constant of the process is the duration of time in which the process output has changed by approximately 66.7% in response to a disturbance such as a change in the set point value. The closed-loop control bandwidth is limited by the nature of the system and uncertainty represented by the quality of the data collected during testing. The tuning algorithm permits the operator to adjust the desired closed-loop control bandwidth $\omega_c$ 34 to get a desirable loop with acceptable performance.

An approximate range for the desired closed-loop control bandwidth $\omega_c$ 34 can be obtained using a pre-tuning step test.

In the preferred embodiment of this invention, the disturbance signal $u_{id}$ on path 24 includes one or more step changes. In an alternate embodiment, the disturbance signal $u_{id}$ on path 24 includes a pseudo random binary sequence. In another embodiment of this invention, the disturbance signal $u_{id}$ on path 24 includes band-pass filtered noise. In yet another embodiment, the disturbance signal $u_{id}$ on path 24 includes clipped white noise.

In the preferred embodiment of this invention, a recursive least squares algorithm is used to fit the PID gains to meet the following objective:

$$min\|u_{ID}(L-GK)/(1+GK)^5\|_2 \quad \text{Equation (5)}$$

which is equivalent to $$min\|Lu+Ke\|_2 \quad \text{Equation (6)}$$

Since G does not explicitly appear in this objective it allows one to directly tune the PID controller gains without the need for a model of the controlled process 30. In the preferred embodiment of the PID feedback controller of this invention, this is a solution to a least-squares problem.

In the preferred embodiment of this invention, the auto-tuning PID controller is based on the loop-shaping concept described above. The proportional gain $K_p$, integral gain $K_i$, and the derivative gain $K_d$ are determined by directly fitting the loop transfer function to a target loop-shape. Thus, the PID gains are automatically estimated recursively without identifying a model for the process 30 and/or the controller 12, and with minimal operator interaction.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method for determining one or more new gains for a controller while the controller continues to control a process towards a target loop transfer function, the controller receiving a process output signal and a process set point signal and providing a controller output signal, the method comprising the steps of:
    introducing a disturbance into the controller output signal to form a process input control signal, wherein the process input control signal is input to the process;
    calculating one or more new gains for the controller using the controller output signal, the process input control signal, and the target loop transfer function, and without requiring an output signal from the process;
    using the one or more new gains in the controller to subsequently control the process.

2. The method of claim 1, wherein the one or more new gains for the controller are determined without using a model of the process.

3. The method of claim 1, wherein said gains include a proportional gain.

4. The method of claim 1, wherein said gains include an integral gain.

5. The method of claim 1, wherein said gains include a derivative gain.

6. The method of claim 1, wherein the target loop transfer function is indicative of a desired response of the process.

7. The method of claim 6, wherein the target loop transfer function is a first-order transfer function.

8. The method of claim 6, wherein the target loop transfer function is a second-order transfer function.

9. The method of claim 1, wherein the process is controlled within a desired closed-loop control bandwidth.

10. The method of claim 9, wherein the desired closed-loop control bandwidth is indicative of a desired settling time for the process.

11. The method of claim 9, wherein the desired closed-loop control bandwidth is indicative of a time constant for the process.

12. The method of claim 1, wherein the disturbance includes one or more step changes.

13. The method of claim 1, wherein the disturbance includes a pseudo random binary sequence.

14. The method of claim 1, wherein the disturbance includes a white noise signal that is band-pass filtered and clipped.

15. The method of claim 1, wherein the disturbance is introduced into the controller output signal causing a response in the process input control signal.

16. The method of claim 1, wherein the controller uses the one or more new gains to produce the controller output signal.

17. The method of claim 16, wherein the controller output signal comprises a proportional error.

18. The method of claim 16, wherein the controller output signal comprises an integral error.

19. The method of claim 16, wherein the controller output signal comprises a derivative error.

20. The method of claim 1, wherein the process input control signal is the sum of the controller output and the disturbance.

21. The method of claim 1, wherein the new gains for the controller are calculated such that the sum total of the controller output and the product of the process input control signal and the target loop transfer function is minimized.

22. The method of claim 21, wherein the sum total is minimized by curve fitting said sum total using recursive least squares technique.

23. The method of claim 21, wherein the sum total is minimized by curve fitting said sum total using recursive least squares technique with one or more constraint.

24. The method of claim 23, wherein the recursive least squares technique constraint comprises positive values for the one or more new gains for the controller.

25. A tuning device for tuning one or more new gains of a controller while the controller controls a process towards a target loop transfer function, the controller receiving a process output signal and a process set point signal and providing a controller output signal, the gain tuning device comprising:

disturbance generating means for generating a disturbance in the controller output signal to form a process input control signal, wherein the process input control signal is input to the process;

calculating means for calculating one or more new gains of the controller using the controller output signal, the process input control signal, and the target loop transfer function, and without requiring an output signal from the process;

providing means for providing the one or more new gains to the controller, whereby the controller uses the new gains to subsequently control the process.

* * * * *